United States Patent
Yokoyama et al.

(10) Patent No.: US 11,767,266 B2
(45) Date of Patent: Sep. 26, 2023

(54) METHOD FOR PRODUCING SOLID COMPOSITION AND METHOD FOR PRODUCING FUNCTIONAL CERAMIC

(71) Applicant: SEIKO EPSON CORPORATION, Tokyo (JP)

(72) Inventors: Tomofumi Yokoyama, Nagano (JP); Hitoshi Yamamoto, Nagano (JP); Naoyuki Toyoda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 243 days.

(21) Appl. No.: 17/215,353

(22) Filed: Mar. 29, 2021

(65) Prior Publication Data
US 2021/0300826 A1    Sep. 30, 2021

(30) Foreign Application Priority Data

Mar. 30, 2020   (JP) ................................. 2020-059816

(51) Int. Cl.
| | | |
|---|---|---|
| *C04B 35/26* | (2006.01) | |
| *C04B 35/44* | (2006.01) | |
| *C04B 35/45* | (2006.01) | |
| *C04B 35/63* | (2006.01) | |

(52) U.S. Cl.
CPC .......... *C04B 35/2675* (2013.01); *C04B 35/44* (2013.01); *C04B 35/4508* (2013.01); *C04B 35/6303* (2013.01); *C04B 2235/443* (2013.01); *C04B 2235/448* (2013.01); *C04B 2235/5454* (2013.01); *C04B 2235/764* (2013.01); *C04B 2235/768* (2013.01)

(58) Field of Classification Search
CPC ............ C04B 35/4508; C04B 35/6303; C04B 2235/443; C04B 2235/448; C04B 2235/5454; C04B 2235/764; C04B 2235/768
See application file for complete search history.

(56) References Cited

U.S. PATENT DOCUMENTS

2011/0210658 A1    9/2011    Pan et al.

FOREIGN PATENT DOCUMENTS

| CN | 104150539 B | * | 1/2016 |
|---|---|---|---|
| JP | 2010-045019 A | | 2/2010 |
| JP | 2011-073937 A | | 4/2011 |
| JP | 2013-518797 A | | 5/2013 |
| JP | 2017-094442 A | | 6/2017 |

OTHER PUBLICATIONS

CN104150539B machine translation (Year: 2016).*

(Continued)

*Primary Examiner* — Karl E Group
*Assistant Examiner* — Cameron K Miller
(74) *Attorney, Agent, or Firm* — Global IP Counselors, LLP

(57) ABSTRACT

A method for producing a solid composition according to the present disclosure is a method for producing a solid composition that is used for forming a functional ceramic having a first crystal phase. The method for producing a solid composition includes: producing an oxide composed of a second crystal phase different from the first crystal phase; and mixing the oxide and an oxo acid compound.

8 Claims, 3 Drawing Sheets

(56) References Cited

OTHER PUBLICATIONS

Guo, Hanzheng, et al. "Hydrothermal-assisted cold sintering process: a new guidance for low-temperature ceramic sintering." ACS applied materials & interfaces 8.32 (2016): 20909-20915. (Year: 2016).*

Zhao Wenqing et al., "Preparation of YAG Phosphor by Sol-Gel Method and Study on Its Properties", Institute of Materials Science and Engineering, Henan Polytechnic University, New Chemical Materials, vol. 37, No. 12, Dec. 2009, pp. 98-100, with English translation (Year: 2009).*

\* cited by examiner

METHOD FOR PRODUCING SOLID COMPOSITION AND METHOD FOR PRODUCING FUNCTIONAL CERAMIC

The present application is based on, and claims priority from JP Application Serial Number 2020-059816, filed Mar. 30, 2020, the disclosure of which is hereby incorporated by reference herein in its entirety.

BACKGROUND

1. Technical Field

The present disclosure relates to a method for producing a solid composition and a method for producing a functional ceramic.

2. Related Art

There has been various functional ceramics composed of multiple oxides, specifically, functional ceramics such as a phosphor ceramic, a wavelength conversion ceramic, a magnetic ceramic, and a superconductor ceramic.

In the related art, a multiple oxide ceramic has been obtained by mixing a compound and a plurality of oxide particles including constituent elements of the multiple oxide ceramic, performing a synthesis reaction in an oxidizing atmosphere, pulverizing and shaping the mixture, and then calsining the mixture at a high temperature again.

For example, Japanese Patent No. 5763683 discloses a method for producing a composite that is a phosphor ceramic, in which yttrium aluminum garnet and a wavelength conversion ceramic are laminated, in which a mixture of oxide powders, which are raw materials of a phosphor and the wavelength conversion ceramic, is tape cast, laminated, and then fired at a high temperature.

JP-A-2011-73937 describes a method for forming a magnetic ceramic for a non-reciprocal circuit element by calsining an yttrium iron garnet ceramic used as a ferrite core integrally with a conductor formed of a noble metal.

Further, JP-A-2017-94442 discloses that, in order to form a YBCO element used as a superconductor, YBCO synthesized by high-temperature calsining is pulverized to obtain a pulverized product, and then the pulverized product is baked again to obtain a bulk element.

In the case of U.S. Pat. No. 5,763,683, when a product obtained by a heat treatment, that is, annealing, is pulverized, and then a heat treatment, that is, calsining, is performed again, yttrium ions are volatilized into calsining gas, a composition of a ceramic finally obtained shifts from a desired composition, and desired characteristics cannot be obtained.

In JP-A-2011-73937, when different oxides are simultaneously fired at a high temperature, unnecessary element diffusion is likely to occur at an interface between different materials, and defects such as oxygen vacancies are generated inside, and thus characteristics of a phosphor are deteriorated.

In addition, in JP-A-2017-94442, impurity crystals are likely to be formed due to a phase transition of crystals and generation of oxygen defects at the time of re-calsining at a high temperature, and a critical current density in the magnetic field, which is a main characteristic of a superconductor, decreases.

In order to avoid the above problems, a calsining auxiliary may be added, but in this case, reaction calsining may be involved, and by-products such as water and acid are generated during heat generation due to thermal decomposition and phase transformation of a melting agent, thereby etching an interface between different materials.

SUMMARY

The present disclosure is made to solve the above problems, and can be implemented as the following application examples.

A method for producing a solid composition according to an application example of the present disclosure is a method for producing a solid composition used for forming a functional ceramic that has a first crystal phase. The method for producing a solid composition includes: producing an oxide composed of a second crystal phase different from the first crystal phase; and mixing the oxide with an oxo acid compound.

A method for producing a functional ceramic according to an application example of the present disclosure includes: producing a solid composition by the method for producing a solid composition according to the present disclosure; and heating the solid composition at a temperature of 700° C. or higher and 1000° C. or lower.

DESCRIPTION OF EXEMPLARY EMBODIMENTS

Figure 1:
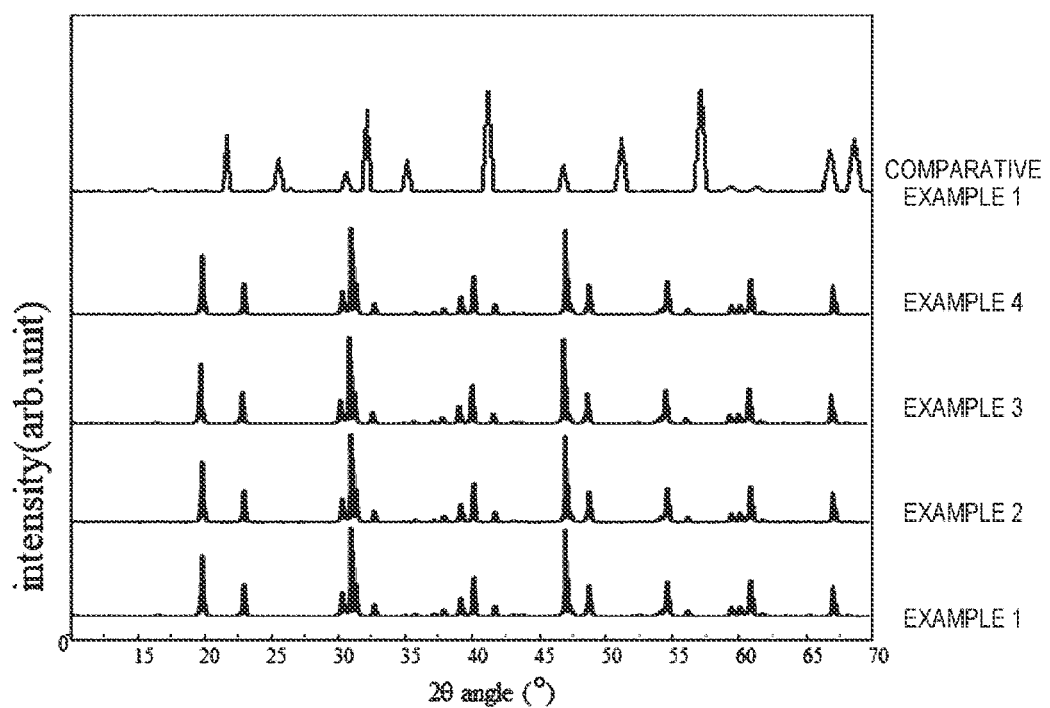
FIG. 1 is a graph showing X-ray diffraction patterns of precursor oxides constituting solid compositions according to Examples 1 to 4 and a solid composition according to Comparative Example 1.

Hereinafter, preferred embodiments of the present disclosure will be described in detail.

1. Solid Composition

First, prior to a method for producing a solid composition according to the present disclosure, a solid composition according to the present disclosure, that is, a solid composition produced by using the method for producing a solid composition according to the present disclosure will be described.

The solid composition according to the present disclosure is produced using the method for producing a solid composition according to the present disclosure described in detail later.

Such a solid composition is used for forming a functional ceramic that has a first crystal phase. The solid composition further contains an oxide composed of a second crystal phase different from the first crystal phase and an oxo acid compound at normal temperature and pressure.

Accordingly, it is possible to provide a solid composition capable of stably forming a functional ceramic that has desired characteristics by a heat treatment at a relatively low temperature for a relatively short time. More specifically, when the oxo acid compound is contained in the solid composition, a melting point of the oxide is lowered, and a growth of a high temperature phase crystal can be promoted by a calsining treatment which is a heat treatment at a relatively low temperature for a relatively short time. In addition, the melting point of the oxide can be lowered and a calsining temperature and a bonding temperature with different materials can be lowered while etching of an interface and generation of a by-product is prevented. For example, excellent adhesion to an adherend can be obtained even by a heat treatment at a relatively low temperature.

On the other hand, when conditions described above are not satisfied, a satisfying result cannot be obtained.

For example, when the solid composition does not contain the oxo acid compound, the effect of lowering the melting point of the oxide cannot be obtained, calsining does not proceed sufficiently by a heat treatment at a relatively low temperature for a relatively short time, and it is difficult to obtain a functional ceramic having a target crystal phase.

When the solid composition does not contain the oxide, a functional ceramic, in particular, a functional ceramic composed of multiple oxides cannot be formed.

In the present disclosure, the normal temperature and pressure refers to 25° C. and 1 atm.

1.1 Oxide

The solid composition according to the present disclosure contains an oxide that has a crystal phase different from that of the functional ceramic formed by using the solid composition. Hereinafter, the oxide is also referred to as a "precursor oxide". In the present disclosure, "different" for the crystal phase is a broad concept including not only that types of crystal phases are not the same, but also that types are the same but at least one lattice constant is different. The functional ceramic will be described in detail later.

The precursor oxide may be any one as long as having the second crystal phase different from the crystal phase of the functional ceramic formed by using the solid composition according to the present disclosure, that is, the first crystal phase. There are various combinations of a form of the crystal phase of the functional ceramic and a form of the crystal phase of the precursor oxide. For example, when the crystal phase of the functional ceramic formed by using the solid composition according to the present disclosure, that is, the first crystal phase, is a cubic garnet type crystal, the crystal phase of the precursor oxide, that is, the second crystal phase, is a perovskite type crystal.

The garnet type crystal has a problem that ions at an A site are volatilized during high-temperature calsining and a composition tends to shift, and segregation of elements occurs at grain boundary triple junctions and the like, which tends to deteriorate the characteristics of the ceramic. On the other hand, in the present disclosure, since uniformity and crystallinity of the composition are further improved due to a decrease caused by the oxo acid in a temperature at which crystal phase transformation is caused and a decrease in the melting point, a process of generating and calsining a crystal at a low temperature can be applied, and particularly when the second crystal phase is a perovskite type crystal, a functional ceramic composed of a cubic garnet type crystal can be more stably formed with a desired composition. Accordingly, when the crystal phase of the functional ceramic formed by using the solid composition according to the present disclosure, that is, the first crystal phase, is a cubic garnet type crystal, and the crystal phase of the precursor oxide, that is, the second crystal phase, is a perovskite type crystal, the effect according to the present disclosure is more remarkably exhibited.

When the solid composition containing the precursor oxide that has the perovskite type crystal is heated at a relatively low temperature, for example, at a temperature range of 700° C. or more and 1000° C. or less, particularly at a temperature range of 800° C. or more and 950° C. or less, a high-quality functional ceramic composed of a cubic garnet type crystal can be obtained.

For example, when the crystal phase of the functional ceramic formed by using the solid composition according to the present disclosure, that is, the first crystal phase, is a perovskite type crystal, the crystal phase of the precursor oxide, that is, the second crystal phase, is a cubic type crystal.

Accordingly, even when calsining is performed at a lower temperature, a fired body having high crystallinity can be suitably obtained.

When the solid composition containing the precursor oxide that is a cubic type crystal is heated at a relatively low temperature, for example, at a temperature range of 700° C. or more and 1000° C. or less, particularly at a temperature range of 800° C. or more and 950° C. or less, a high-quality functional ceramic composed of the perovskite type crystal can be obtained.

For example, when the crystal phase of the functional ceramic formed by using the solid composition according to the present disclosure, that is, the first crystal phase, is a garnet type crystal, the crystal phase of the precursor oxide, that is, the second crystal phase, is a $YFeO_3$ type crystal.

As a result, even when the calsining is performed at a lower temperature, a fired body having high crystallinity can be suitably obtained, and for example, a thin film having high magneto-optical characteristics can be easily obtained.

When the solid composition containing a precursor oxide that is a $YFeO_3$ type crystal is heated at a relatively low temperature, for example, in a temperature range of 700° C. or more and 1000° C. or less, particularly in a temperature range of 720° C. or more and 800° C. or less, a high-quality functional ceramic composed of a garnet type crystal can be obtained.

The second crystal phase is not limited to the above as long as the second crystal phase is different from the first crystal phase, and may be, for example, an orthorhombic crystal and a hexagonal crystal.

The first crystal phase is not limited to the above as long as the first crystal phase is different from the second crystal phase, and may be, for example, an orthorhombic crystal, a hexagonal crystal, and a monoclinic crystal.

A composition of the precursor oxide is not particularly limited, and is usually determined according to a composition of the functional ceramic to be produced by using the solid composition according to the present disclosure.

For example, when the functional ceramic to be produced by using the solid composition according to the present disclosure is YAG:$Ce^{3+}$, that is, a cerium solute yttrium aluminum garnet, which is used as a phosphor ceramic or the like, the precursor oxide is preferably a multiple oxide containing yttrium, aluminum, and cerium.

When the functional ceramic to be produced by using the solid composition according to the present disclosure is YBCO, that is, yttrium barium copper perovskite, which is used as a superconductor ceramic or the like, the precursor oxide is preferably a multiple oxide containing yttrium, barium, and copper.

A crystal grain size of the precursor oxide is not particularly limited, but is preferably 10 nm or more and 200 nm or less, more preferably 15 nm or more and 180 nm or less, and even more preferably 20 nm or more and 160 nm or less.

Accordingly, a melting temperature of the precursor oxide and a calsining temperature of the solid composition can be further lowered by a so-called Gibbs-Thomson effect which is a melting point lowering phenomenon accompanied by an increase in surface energy. In addition, it is also advantageous in improving bonding between the functional ceramic formed by using the solid composition according to the present disclosure and different materials and reducing a defect density.

The precursor oxide is preferably composed of a substantially single crystal phase.

Accordingly, the number of crystal phase transition that occurs when the functional ceramic is produced using the solid composition according to the present disclosure, that is, when a high-temperature crystal phase is formed, is substantially one, and thus generation of impurity crystals due to element segregation or element thermal decomposition accompanying with the crystal phase transition is prevented, and various characteristics of the functional ceramic to be produced, for example, optical, electrical, and mechanical characteristics are further improved.

In a case where only one exothermic peak in a range of 300° C. or higher and 1000° C. or lower is observed when the solid composition according to the present disclosure is measured by TG-DTA at a temperature rising rate of 10° C./min, it can be determined that the precursor oxide is composed of a "substantially single crystal phase".

A content of the precursor oxide in the solid composition according to the present disclosure is not particularly limited, but is preferably 20% by mass or more and 95% by mass or less, more preferably 35% by mass or more and 85% by mass or less, and even more preferably 50% by mass or more and 80% by mass or less.

Accordingly, even when the heat treatment for the solid composition is performed at a lower temperature for a shorter time, a functional ceramic having excellent desired characteristics can be more stably produced.

The solid composition according to the present disclosure may contain a plurality of types of precursor oxides. When the solid composition according to the present disclosure contains a plurality of types of precursor oxides, a sum of contents of the plurality of types of precursor oxides is adopted as a value of the content of the precursor oxide in the solid composition according to the present disclosure.

1.2 Oxo Acid Compound

The solid composition according to the present disclosure contains the oxo acid compound.

When the solid composition contains the oxo acid compound in this manner, the melting point of the precursor oxide can be suitably lowered, a crystal growth of the multiple oxide as the functional ceramic can be promoted, and a functional ceramic having desired characteristics can be stably formed by a heat treatment at a relatively low temperature for a relatively short time. In addition, adhesion between the formed functional ceramic and an adherend can be improved.

The oxo acid compound is a compound containing an oxo anion.

The oxo anion constituting the oxo acid compound does not contain a metal element, and examples thereof include a halogen oxo acid, a borate ion, a carbonate ion, an orthocarbonate ion, a carboxylate ion, a silicate ion, a nitrite ion, a nitrate ion, a phosphite ion, a phosphate ion, an arsenate ion, a sulfite ion, a sulfate ion, a sulfonate ion, and a sulfinate ion. Examples of the halogen oxo acid include a hypochlorite ion, a chlorite ion, a chlorate ion, a perchlorate ion, a hypobromite ion, a bromite ion, a bromate ion, a perbromate ion, a hypoiodite ion, an iodite ion, an iodate ion, and a periodate ion.

In particular, the oxo acid compound preferably contains at least one of a nitrate ion and a sulfate ion, and more preferably contains a nitrate ion as an oxo anion.

Accordingly, the melting point of the precursor oxide can be more suitably lowered, and the crystal growth of the multiple oxide as the functional ceramic can be more effectively promoted. Accordingly, even when the heat treatment for the solid composition is performed at a lower temperature for a shorter time, a functional ceramic having excellent desired characteristics can be more suitably produced.

A cation constituting the oxo acid compound is not particularly limited. Examples of the cation include a hydrogen ion, an ammonium ion, an yttrium ion, an aluminum ion, a cerium ion, a barium ion and a copper ion. One type or a combination of two or more types selected from the examples of the cation may be used. The cation is preferably an ion of a constituent metal element of the functional ceramic to be formed by using the solid composition according to the present disclosure.

This makes it possible to more effectively prevent undesirable impurities from remaining in the formed functional ceramic.

A content of the oxo acid compound in the solid composition according to the present disclosure is not particularly limited, but is preferably 0.1% by mass or more and 80% by mass or less, more preferably 1.0% by mass or more and 50% by mass or less, and even more preferably 5.0% by mass or more and 20% by mass or less.

Accordingly, the functional ceramic can be suitably obtained from the solid composition by a heat treatment at a lower temperature for a shorter time while the oxo acid compound is prevented from unexpectedly remaining in the functional ceramic formed by using the solid composition according to the present disclosure, and the desired characteristics of the obtained functional ceramic can be made particularly excellent.

When the content of the precursor oxide in the solid composition according to the present disclosure is defined as XP [% by mass] and the content of the oxo acid compound in the solid composition according to the present disclosure is defined as XO [% by mass], it is preferable that $0.001 \leq XO/XP \leq 4.00$, more preferable that $0.01 \leq XO/XP \leq 2.00$, and even more preferable that $0.05 \leq XO/XP \leq 0.25$.

Accordingly, the functional ceramic can be suitably obtained from the solid composition by a heat treatment at a lower temperature for a shorter time while the oxo acid compound is prevented from unexpectedly remaining in the functional ceramic formed by using the solid composition according to the present disclosure, and the desired characteristics of the obtained functional ceramic can be made particularly excellent.

The solid composition according to the present disclosure may contain a plurality of types of oxo acid compounds. When the solid composition according to the present disclosure contains a plurality of types of oxo acid compounds, a sum of contents of the plurality of types of oxo acid compounds is adopted as a value of the content of the oxo acid compound in the solid composition according to the present disclosure.

1.3 Other Components

As described above, the solid composition according to the present disclosure contains the precursor oxide and the oxo acid compound, and may further contain other components. Hereinafter, among components constituting the solid composition according to the present disclosure, components other than the precursor oxide and the oxo acid compound are referred to as "other components".

Examples of the other components contained in the solid composition according to the present disclosure include an oxide having the same crystal phase as that of the functional ceramic to be produced by using the solid composition according to the present disclosure, and a solvent component used in a production process of the solid composition according to the present disclosure.

A content of the other components in the solid composition according to the present disclosure is not particularly limited, but is preferably 10% by mass or less, more preferably 5.0% by mass or less, and even more preferably 0.5% by mass or less.

The solid composition according to the present disclosure may contain a plurality of types of components as the other components. In this case, a sum of contents of the other components is adopted as a value of the content of the other components in the solid composition according to the present disclosure.

The solid composition according to the present disclosure may be in a solid state as a whole, and may contain, for example, a liquid component such as a liquid component used in the production process. It is noted that in this case, a content of the liquid component in the solid composition is preferably 5% by mass or less, and more preferably 1% by mass or less.

2. Method for Producing Solid Composition

Next, a method for producing a solid composition according to the present disclosure will be described.

The method for producing a solid composition according to the present disclosure is a method for producing a solid composition used for forming the functional ceramic that has the first crystal phase. The method includes: a precursor oxide production step of producing an oxide composed of the second crystal phase different from the first crystal phase, that is, the precursor oxide; and an oxo acid compound mixing step of mixing the precursor oxide and the oxo acid compound.

Accordingly, it is possible to provide the method for producing a solid composition capable of suitably producing the solid composition. The solid composition can stably form the functional ceramic having the desired characteristics by a heat treatment at a relatively low temperature for a relatively short time.

More specifically, the solid composition containing the oxo acid compound and the oxide composed of the second crystal phase different from the first crystal phase can be suitably produced by the method as described above. The solid composition obtained in this manner can stably form a functional ceramic having the desired characteristics by a heat treatment at a relatively low temperature for a relatively short time. That is, when the oxo acid compound is contained in the solid composition, the melting point of the oxide can be lowered, the crystal growth is promoted by a calsining treatment which is a heat treatment at a relatively low temperature for a relatively short time, and an adhesion interface with the adherend can be formed.

Hereinafter, each step will be described in detail.

2.1 Precursor Oxide Production Step

In the precursor oxide production step, the precursor oxide is produced. The precursor oxide is an oxide composed of a crystal phase different from a crystal phase of the functional ceramic to be finally obtained, that is, the first crystal phase, that is, the second crystal phase.

The precursor oxide may be produced by any method, and is preferably produced by subjecting a mixture containing a plurality of types of metal compounds as a raw material containing a metal element constituting the precursor oxide in a molecule to a heat treatment.

Thus, the precursor oxide can be more stably obtained.

In particular, in the present embodiment, the precursor oxide production step includes: a metal compound solution preparation step of preparing a metal compound solution that contains a solvent and the metal compound containing the metal element constituting the precursor oxide in the molecule, a first heat treatment step of subjecting the metal compound solution to a first heat treatment, and a second heat treatment step of subjecting a composition obtained by the first heat treatment to a second heat treatment at a temperature higher than that of the first heat treatment.

2.1.1 Metal Compound Solution Preparation Step

In the metal compound solution preparation step, the metal compound solution that contains the solvent and the metal compound containing the metal element constituting the precursor oxide in the molecule is prepared.

When the precursor oxide contains a plurality of types of metal elements, for example, the metal compound solution can be prepared by preparing solutions for the metal compounds corresponding to the metal elements and mixing the solutions.

In addition, for example, the metal compound solution may be prepared by dissolving a plurality of types of metal compounds corresponding to two or more types of metal elements constituting the precursor oxide in the same solvent.

For example, in the preparation of the metal compound solution, a metal compound containing two or more types of metal elements constituting the precursor oxide in the molecule may be used.

For the same metal element, two or more metal compounds may be used.

When the precursor oxide contains a plurality of types of metal elements, in this step, it is preferable that these metal elements are mixed stoichiometrically at a ratio corresponding to a composition of the functional ceramic to be finally formed. A dispersion liquid may be used instead of the solution.

In the preparation of the metal compound solution, for example, the oxo acid compound may be used in addition to the metal compound. A compound containing an oxo anion may be used as the metal compound.

As the metal compound containing the metal element constituting the precursor oxide in the molecule, for example, the following compounds can be used.

That is, examples of an yttrium compound serving as an yttrium source include an yttrium metal salt and an yttrium alkoxide. One type or a combination of two or more types among the examples of the yttrium compound may be used. Examples of the yttrium metal salt include yttrium chloride, yttrium nitrate, yttrium sulfate, yttrium acetate, yttrium hydroxide, and yttrium carbonate. Examples of the yttrium alkoxide include yttrium methoxide, yttrium ethoxide, yttrium propoxide, yttrium isopropoxide, yttrium butoxide, yttrium isobutoxide, yttrium secondary-butoxide, yttrium tertiary-butoxide, and dipivaloylmethanato yttrium. When the yttrium compound as described above is used, for example, YAG:$Ce^{3+}$, that is, cerium solute yttrium aluminum garnet, which is used as a phosphor ceramic and the like, and YBCO, that is, yttrium barium copper perovskite, which is used as a superconductor ceramic and the like, can be suitably produced as the functional ceramic by using the solid composition according to the present disclosure. Among these, at least one of yttrium ethoxide and yttrium nitrate is preferably used as the yttrium compound. A hydrate may be used as the yttrium source.

Examples of an aluminum compound serving as an aluminum source include an aluminum metal salt and an aluminum alkoxide. One type or a combination of two or more types among the examples of the aluminum compound may be used. Examples of the aluminum metal salt include aluminum chloride, aluminum nitrate, aluminum sulfate, and aluminum acetate. Examples of the aluminum alkoxide include aluminum trimethoxide, aluminum triethoxide, aluminum tripropoxide, aluminum triisopropoxide, aluminum tributoxide, aluminum triisobutoxide, aluminum tri-secondary-butoxide, aluminum tri-tertiary-butoxide, and dipivaloylmethanato aluminum. When the aluminum compound as described above is used, for example, YAG:$Ce^{3+}$, that is, cerium solute yttrium aluminum garnet, which is used as a phosphor ceramic and the like, can be suitably produced as the functional ceramic by using the solid composition according to the present disclosure. Among these, at least one of aluminum nitrate and aluminum triisopropoxide is preferably used as the aluminum compound. A hydrate may be used as the aluminum source.

Examples of a cerium compound serving as a cerium source include a cerium metal salt and a cerium alkoxide. One type or a combination of two or more types among the examples of the cerium compound may be used. Examples of the cerium metal salt include cerium chloride, cerium bromide, cerium nitrate, and cerium sulfate. Examples of the cerium alkoxide include cerium trimethoxide, cerium triethoxide, cerium triisopropoxide, cerium trinormal propoxide, cerium triisobutoxide, cerium trinormal butoxide, cerium tri-secondary-butoxide, and cerium tri-tertiary-butoxide. When the cerium compound as described above is used, for example, YAG:$Ce^{3+}$, that is, cerium solute yttrium aluminum garnet, which is used as a phosphor ceramic and the like, can be suitably produced as the functional ceramic by using the solid composition according to the present disclosure. Among these, at least one of cerium nitrate and cerium triisopropoxide is preferably used as the cerium compound. A hydrate may be used as the cerium source.

Examples of a barium compound serving as a barium source include a barium metal salt and an organic barium compound. One type or a combination of two or more types among the examples of the barium compound may be used. Examples of the barium metal salt include barium chloride, barium nitrate, barium sulfate, and barium acetate. Examples of the organic barium compound include dimethoxy barium, diethoxy barium, dipropoxy barium, diisopropoxy barium, dibutoxy barium, diisobutoxy barium, di-secondary-butoxy barium, di-tertiary-butoxybarium, and dipivaloylmethnato barium. When the barium compound as described above is used, for example, YBCO, that is, yttrium barium copper perovskite, which is used as a superconductor ceramic and the like, can be suitably produced as the functional ceramic by using the solid composition according to the present disclosure. Among the examples of the barium compound, at least one of barium nitrate and diethoxy barium is preferably used as the barium compound. A hydrate may be used as the barium source.

Examples of a copper compound serving as a copper source include a copper metal salt and an organic copper compound. One type or a combination of two or more types among the examples of the copper compound may be used. Examples of the copper metal salt include copper chloride, copper bromide, copper nitrate, and copper sulfate. Examples of the organic copper compound include: copper dimethoxide, copper diethoxide, copper diisopropoxide, copper dinormal propoxide, copper diisobutoxide, copper dinormal butoxide, copper di-secondary-butoxide, copper di-tertiary-butoxide, and bis(dipivaloylmethanato)copper. When the copper compound as described above is used, for example, YBCO, that is, yttrium barium copper perovskite, which is used as a superconductor ceramic and the like, can be suitably produced as the functional ceramic by using the solid composition according to the present disclosure. Among these, at least one of copper nitrate and bis(dipivaloylmethanato)copper is preferably as the copper compound. A hydrate may be used as the copper source.

The solvent is not particularly limited, and various organic solvents or the like may be used. More specifically, examples of the solvent include alcohols, glycols, esters, ethers, organic acids, aromatics, and amides. A mixed solvent containing one type or a combination of two or more types selected from the examples of the solvent may be used. Examples of the alcohols include methyl alcohol, ethyl alcohol, n-propyl alcohol, isopropyl alcohol, n-butyl alcohol, allyl alcohol, and 2-n-butoxyethanol. Examples of the glycols include ethylene glycol, propylene glycol, butylene glycol, hexylene glycol, pentanediol, hexanediol, heptanediol, and dipropylene glycol. Examples of the esters include ketones such as dimethyl ketone, methyl ethyl ketone, methyl propyl ketone, and methyl isobutyl ketone, methyl formate, ethyl formate, methyl acetate, and methyl acetoacetate. Examples of the ethers include diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. Examples of the organic acids include formic acid, acetic acid, 2-ethyl-butyric acid, and propionic acid. Examples of the aromatics include toluene, o-xylene, and p-xylene. Examples of the amides include formamide, N,N-dimethylformamide, N,N-diethylformamide, dimethylacetamide, and N-methylpyrrolidone. Among these, at least one of 2-n-butoxyethanol and propionic acid is preferably used as the solvent.

2.1.2 First Heat Treatment Step

The metal compound solution prepared as described above is subjected to the first heat treatment. As a result, the metal compound solution is generally gelled.

Conditions of the first heat treatment depend on a boiling point, a vapor pressure, and the like of the solvent. A heating temperature in the first heat treatment is preferably 50° C. or higher and 250° C. or lower, more preferably 60° C. or higher and 230° C. or lower, and even more preferably 80° C. or higher and 200° C. or lower. In the first heat treatment, the heating temperature may be changed. For example, the first heat treatment may have a first stage in which the heat treatment is performed at a relatively low temperature, and a second stage in which the heat treatment is performed at a relatively high temperature by raising the temperature after the first stage. In such a case, a maximum temperature in the first heat treatment is preferably within the ranges described above.

A heating time in the first heat treatment is preferably 10 minutes or longer and 180 minutes or shorter, more preferably 20 minutes or longer and 120 minutes or shorter, and even more preferably 30 minutes or longer and 60 minutes or shorter.

The first heat treatment may be performed in any atmosphere, may be performed in an oxidizing atmosphere such as air or an oxygen gas atmosphere, or may be performed in a non-oxidizing atmosphere of a nitrogen gas, or an inert gas such as a helium gas and an argon gas. The first heat treatment may be performed under reduced pressure or vacuum, or may be performed under pressurization.

In the first heat treatment, the atmosphere may be maintained under substantially the same conditions, or may be changed under different conditions. For example, the first heat treatment may have a first stage in which the heat treatment is performed in a normal pressure environment, and a second stage in which the heat treatment is performed in a reduced pressure environment after the first stage.

2.1.3 Second Heat Treatment Step

Thereafter, a composition obtained by the first heat treatment, that is, a gel-like composition is subjected to the second heat treatment.

Thus, the precursor oxide is obtained.

Conditions of the second heat treatment depend on a composition of the formed oxide, and the like. A heating temperature in the second heat treatment may be higher than the processing temperature in the first heat treatment, and is preferably 400° C. or higher and 600° C. or lower, more preferably 430° C. or higher and 570° C. or lower, and even more preferably 450° C. or higher and 550° C. or lower. In the second heat treatment, the heating temperature may be changed. For example, the second heat treatment may have a first stage in which the heat treatment is performed at a relatively low temperature, and a second stage in which the heat treatment is performed at a relatively high temperature by raising the temperature after the first stage. In such a case, a maximum temperature in the second heat treatment is preferably within the ranges described above.

A heating time in the second heat treatment is preferably 5 minutes or longer and 180 minutes or shorter, more preferably 10 minutes or longer and 120 minutes or shorter, and even more preferably 15 minutes or longer and 60 minutes or shorter.

The second heat treatment may be performed in any atmosphere, may be performed in an oxidizing atmosphere such as air or an oxygen gas atmosphere, or may be performed in a non-oxidizing atmosphere of a nitrogen gas, or an inert gas such as a helium gas and an argon gas. The second heat treatment may be performed under reduced pressure, or vacuum, or may be performed under pressurization. In particular, the second heat treatment is preferably performed in the oxidizing atmosphere.

In the second heat treatment, the atmosphere may be maintained under substantially the same conditions, or may be changed under different conditions. For example, the second heat treatment may have a first stage in which the heat treatment is performed in an inert gas atmosphere and a second stage in which the heat treatment is performed in the oxidizing atmosphere after the first stage.

2.2 Oxo Acid Compound Mixing Step

In the oxo acid compound mixing step, the precursor oxide obtained in the precursor oxide production step and the oxo acid compound are mixed.

Thus, the solid composition according to the present disclosure containing the precursor oxide and the oxo acid compound is obtained.

As the oxo acid compound, for example, the compounds described in 1.2 above can be used. Thus, the same effects as those described above can be obtained.

In the present step, other components may be used in addition to the precursor oxide and the oxo acid compound.

The precursor oxide and the oxo acid compound may be mixed in a dry condition or a wet condition. When the mixing is performed in a wet condition, a step of removing a liquid component contained in the system may be performed after the mixing.

In the solid composition obtained in this manner, most of the liquid components such as the solvent used in the production process is generally removed, but a part of the liquid components may remain. It is noted that a content of the liquid component in the solid composition is preferably 1.0% by mass or less, and more preferably 0.1% by mass or less. Even when such a small amount of liquid component is contained, such a composition is in a solid state as a whole.

The solid composition according to the present disclosure obtained as described above forms the functional ceramic when heated as described in detail later, particularly when heated at a temperature higher than that of the second heat treatment.

Accordingly, when the heat treatment for obtaining the functional ceramic from the solid composition according to the present disclosure is main calsining, the heat treatment for obtaining the precursor oxide, particularly, the second heat treatment described above, can be referred to as temporary calsining. When the functional ceramic obtained by the heat treatment to be described in detail later is used as a main fired body, the precursor oxide can be referred to as a temporary fired body.

3. Method for Producing Functional Ceramic

Next, a method for producing a functional ceramic according to the present disclosure will be described.

The method for producing a functional ceramic according to the present disclosure includes: a step of producing a solid composition by the method for producing a solid composition according to the present disclosure, and a heating step of heating the solid composition at a temperature of 700° C. or higher and 1000° C. or lower.

Accordingly, it is possible to provide a method for producing a functional ceramic by which a functional ceramic having desired characteristics can be stably formed by a heat treatment at a relatively low temperature for a relatively short time. More specifically, when the oxo acid compound is contained in the solid composition, the melting point of the oxide is lowered, and the growth of the high temperature phase crystal can be promoted by the calsining treatment which is a heat treatment at a relatively low temperature for a relatively short time. In addition, the melting point of the oxide can be lowered and the calsining temperature and the bonding temperature with the different materials can be lowered while etching of the interface and generation of a by-product is prevented. For example, excellent adhesion to the adherend can be obtained even by the heat treatment at a relatively low temperature. Since the functional ceramic can be produced by a heat treatment at a relatively low temperature for a relatively short time, for example, the method is also preferred from the viewpoint of energy saving while making productivity of the functional ceramic can be more excellent. In addition, according to the method for producing a functional ceramic according to the present disclosure, there is an advantage that the effects described above can be obtained regardless of conditions such as the composition of the solid composition, particularly the composition and the crystal type of the precursor oxide.

In the method for producing a functional ceramic according to the present disclosure, a plurality of types of solid compositions according to the present disclosure may be used in combination.

As described above, a heating temperature in the heating step of the method for producing a functional ceramic according to the present disclosure may be any value of 700° C. or higher and 1000° C. or lower, but is preferably 730° C. or higher and 980° C. or lower, more preferably 750° C. or higher and 950° C. or lower, and even more preferably 780° C. or higher and 930° C. or lower.

Accordingly, the effects described above are more remarkably exhibited.

In the heating step of the method for producing a functional ceramic according to the present disclosure, the heating temperature may be changed. For example, the heating step of the method for producing a functional ceramic according to the present disclosure may have a first stage in which the heat treatment is performed at a relatively low temperature, and a second stage in which the heat treatment is performed at a relatively high temperature by raising the temperature after the first stage. In such a case, a maximum temperature in the heating step is preferably within the ranges described above.

A heating time in the heating step of the method for producing a functional ceramic according to the present disclosure is not particularly limited, but is preferably 5 minutes or more and 300 minutes or less, more preferably 10 minutes or more and 120 minutes or less, and even more preferably 15 minutes or more and 60 minutes or less.

Accordingly, the effects described above are more remarkably exhibited.

The heating step may be performed in any atmosphere, may be performed in an oxidizing atmosphere such as air or an oxygen gas atmosphere, or may be performed in a non-oxidizing atmosphere of a nitrogen gas, and an inert gas such as a helium gas and an argon gas. The heating step may be performed under reduced pressure or vacuum, or may be performed under pressurization. In particular, the heating step is preferably performed in an oxidizing atmosphere.

In the heating step, the atmosphere may be maintained under substantially the same conditions, or may be changed under different conditions.

In the method for producing a functional ceramic according to the present disclosure, a target functional ceramic, particularly a high quality functional ceramic can be obtained by a heat treatment at a relatively low temperature as described above. In the present disclosure, it is not excluded that a heat treatment at a higher temperature, particularly a heat treatment at a higher temperature for a relatively short time is also performed, in addition to the heat treatment in the temperature range as described above.

In the method for producing a functional ceramic according to the present disclosure, the solid composition according to the present disclosure may be subjected to the heating step as described above in a state of being mixed with other components.

The method for producing a functional ceramic according to the present disclosure may include a step other than the heating step described above.

Generally, the functional ceramic obtained by using the method for producing a functional ceramic according to the present disclosure is substantially free of the oxo acid compound contained in the solid composition according to the present disclosure, which is used as a raw material. More specifically, the content of the oxo acid compound in the functional ceramic obtained by using the method for producing a functional ceramic according to the present disclosure is generally 100 ppm or less, particularly preferably 50 ppm or less, and more preferably 10 ppm or less.

Accordingly, a content of undesirable impurities in the functional ceramic can be prevented, and the characteristics and reliability of the functional ceramic can be made more excellent.

4. Functional Ceramic

The functional ceramic according to the present disclosure can be obtained by the production method as described above. Here, the functional ceramic refers to a ceramic having some functions such as an optical function, a magnetic function, an electrical function, a chemical function, and a thermodynamic function.

A function, a type, a use, and the like of the functional ceramic are not particularly limited, and examples of the functional ceramic include a phosphor ceramic, a wavelength conversion ceramic, a magnetic ceramic, a superconductor ceramic, a dielectric ceramic, a catalyst ceramic, and a thermoelectric ceramic.

The functional ceramic obtained as described above preferably satisfies, for example, the following conditions.

When the functional ceramic is a phosphor ceramic, it is preferable that the ceramic has high crystallinity and high calsining properties so that exciton generated by excitation light fluoresces without being trapped in a band that does not contribute to light emission due to crystal defects, and the excitation light excites an activator without significant internal scattering.

As a result, a fluorescent light source having high internal quantum efficiency, high external extraction efficiency and high fluorescence emission efficiency against the excitation light can be obtained.

When the functional ceramic is an oxide-based superconductor ceramic, it is preferable that the ceramic has few low crystal defects, particularly oxygen defects, a low crystal grain boundary density, and a high degree of crystal grain orientation.

Accordingly, it is possible to increase a superconducting transition temperature Tc, improve a critical current density Jc, and form a superconducting wiring or the like capable of passing a large current at a relatively high temperature.

When the functional ceramic is a magnetic ceramic, a magnetic material having a higher saturation magnetization in a magnetic field bias can be obtained as the number of oxygen deficiencies in the crystal is smaller and the crystallinity is higher. For example, a resonator having a higher Q value can be manufactured.

When used in an element designed to apply a stronger magnetic field with an appropriate electromagnetic stone, a filter or a tuning circuit to which a resonator characteristic having a high Q value is applied can be manufactured.

Although preferred embodiments according to the present disclosure have been described above, the present disclosure is not limited thereto.

For example, the method for producing a solid composition according to the present disclosure may be applied to a method including other steps in addition to the above-described steps. More specifically, for example, a drying step of removing the liquid component contained in the system may be provided after the precursor oxide production step.

In addition, the method for producing a functional ceramic according to the present disclosure may be applied to a method including other steps in addition to the above-described steps.

EXAMPLES

Next, specific examples according to the present disclosure will be described.

5. Production of Solid Composition

Example 1

In the present example, a solid composition used for producing a functional ceramic represented by composition $Y_{2.91}Ce_{0.09}Al_5O_{12}$ was produced as follows.

First, triisopropoxy yttrium serving as an yttrium source, triisopropoxy aluminum serving as an aluminum source, triisopropoxy cerium serving as a cerium source, and 2-n-butoxyethanol serving as a solvent were mixed at a ratio shown in Table 1 to obtain a mixture. The mixture and 2-n-butoxyethanol serving as the solvent were mixed at a predetermined ratio to obtain a metal compound solution as a mixed solution in which respective raw material compounds were dissolved.

Next, the metal compound solution as the mixed solution obtained as described above was subjected to the first heat treatment in air at 140° C. for 20 minutes in a state of being put in a titanium beaker, thereby obtaining a gel-like mixture.

Next, the gel-like mixture obtained as described above was subjected to the second heat treatment at 540° C. for 20 minutes in air to obtain a precursor oxide as an ash-like thermal decomposition product.

Next, the precursor oxide obtained as described above and a solution prepared by dissolving yttrium nitrate hexahydrate as the oxo acid compound in 2-n-butoxyethanol were mixed according to a molar ratio of metal elements in the composition formula of the functional ceramic to obtain a slurry mixture. The mixture was subjected to the heat treatment at 140° C. for 40 minutes to remove 2-n-butoxyethanol, thereby obtaining the solid composition.

The solid composition obtained in this manner contains the precursor oxide composed of a crystal phase of a perovskite type and yttrium nitrate as an oxo acid compound. A ratio of a content of the oxo acid compound to a content of the precursor oxide in the obtained solid composition, that is, a value of XO/XP where a content of the precursor oxide in the solid composition is defined as XP [% by mass] and a content of the oxo acid compound in the solid composition is defined as XO [% by mass], was 0.028.

Examples 2 to 12

Solid compositions were produced in the same manner as in Example 1 except that a composition of the metal compound solution was adjusted to those shown in Tables 1 to 3 by changing a type and an amount of the raw materials used in the preparation of the metal compound solution, and a type and an amount of the oxo acid compound mixed with the precursor oxide obtained from the metal compound solution, and conditions of the first heat treatment and the second heat treatment were adjusted to those shown in Tables 1 to 3.

Comparative Examples 1 to 3

Solid compositions were produced in the same manner as in Example 1 except that the composition of the metal compound solution was adjusted to those shown in Table 4 by changing the type and the amount of the raw materials used in the preparation of the metal compound solution, and the step of mixing the oxo acid compound and the precursor oxide obtained from the metal compound solution and the subsequent step of the heat treatment were omitted. That is, the solid compositions according to Comparative Examples 1 to 3 do not contain the oxo acid compound.

Comparative Example 4

4.57 parts by mass of $Y_2O_3$ powder, 0.216 parts by mass of $CeO_2$ powder and 3.55 parts by mass of $Al_2O_3$ powder were weighed and mixed thoroughly while being crushed in an agate bowl to obtain a mixed powder.

Next, the mixed powder obtained as described above was subjected to the heat treatment in air at 540° C. for 20 minutes to obtain the solid composition.

Comparative Examples 5 and 6

A solid composition was produced in the same manner as in Comparative Example 4 except that the composition of the raw material powder and the mixing ratio thereof were adjusted.

The raw materials used in the preparation of the solid compositions according to Examples and Comparative Examples and production conditions of the solid compositions are collectively shown in Tables 1 to 4, and conditions of the solid compositions according to Examples and Comparative Examples are collectively shown in Table 5. Table 5 also shows the value of XO/XP where the content of the oxo acid compound in the solid composition is defined as XO [% by mass] and the content of the precursor oxide in the solid composition is defined as XP [% by mass]. The solid compositions obtained in Examples and Comparative Examples had a solvent content of 0.1% by mass or less. In addition, when some of the solid composition according to Examples were measured by TG-DTA at a temperature rising rate of 10° C./min, only one exothermic peak was observed in a range of 300° C. or higher and 1000° C. or lower. From this, it can be said that the solid compositions according to these Examples are composed of substantially a single crystal phase. A content of the liquid component in each of the solid compositions according to Examples and Comparative Examples was 100 ppm or less.

TABLE 1

| | | Raw material compound | | Solvent | | First heat treatment | Second heat treatment | | |
|---|---|---|---|---|---|---|---|---|---|
| | | Type | Used amount [parts by mass] | Type | Used amount [parts by mass] | Heating temperature [° C.] | Heating temperature [° C.] | Heating time [minute] | Atmosphere |
| Example 1 | Metal compound used for preparing metal compound solution | Triisopropoxy cerium Triisopropoxy aluminum Triisopropoxy yttrium | 0.29 10.20 7.74 | 2-n-butoxyethanol | 203 | 140 | 540 | 20 | Air |
| | Oxo acid compound mixed with precursor oxide | Yttrium nitrate hexahydrate | 3.34 | | 5 | | | | |
| Example 2 | Metal compound used for preparing metal compound solution | Triisopropoxy cerium Triisopropoxy aluminum Triisopropoxy yttrium | 0.29 10.20 7.74 | 2-n-butoxyethanol | 203 | 140 | 540 | 20 | Air |
| | Oxo acid compound mixed with precursor oxide | Yttrium nitrate octahydrate | 4.07 | | 5 | | | | |

TABLE 1-continued

| | | Raw material compound | | Solvent | | First heat treatment | Second heat treatment | | |
|---|---|---|---|---|---|---|---|---|---|
| | | Type | Used amount [parts by mass] | Type | Used amount [parts by mass] | Heating temperature [° C.] | Heating temperature [° C.] | Heating time [minute] | Atmosphere |
| Example 3 | Metal compound used for preparing metal compound solution | Triisopropoxy cerium Triisopropoxy yttrium Triisopropoxy aluminum | 0.29 7.74 18.75 | 2-n-butoxyethanol | 203 | 140 | 540 | 20 | Air |
| | Oxo acid compound mixed with precursor oxide | Aluminum nitrate nonahydrate | 3.34 | | 6 | | | | |
| Example 4 | Metal compound used for preparing metal compound solution | Triisopropoxy cerium Triisopropoxy yttrium Triisopropoxy aluminum | 0.29 7.74 18.75 | 2-n-butoxyethanol | 203 | 140 | 540 | 20 | Air |
| | Oxo acid compound mixed with precursor oxide | Aluminum nitrate nonahydrate | 4.22 | | 7 | | | | |
| Example 5 | Metal compound used for preparing metal compound solution | Bis(pivaloylmethanato) copper Diethoxy barium Triisopropoxy yttrium | 12.9 4.54 2.66 | 2-n-butoxyethanol | 217 | 140 | 540 | 20 | Air |
| | Oxo acid compound mixed with precursor oxide | Copper nitrate trihydrate | 1.59 | | 14 | | | | |

TABLE 2

| | | Raw material compound | | Solvent | | First heat treatment | Second heat treatment | | |
|---|---|---|---|---|---|---|---|---|---|
| | | Type | Used amount [parts by mass] | Type | Used amount [parts by mass] | Heating temperature [° C.] | Heating temperature [° C.] | Heating time [minute] | Atmosphere |
| Example 6 | Metal compound used for preparing metal compound solution | Bis(pivaloylmethanato)copper Diethoxy barium Triisopropoxy yttrium | 12.9 7.50 2.66 | 2-n-butoxyethanol | 214 | 140 | 540 | 20 | Air |
| | Oxo acid compound mixed with precursor oxide | Copper nitrate trihydrate | 1.69 | | 12 | | | | |
| Example 7 | Metal compound used for preparing metal compound solution | Triisopropoxy yttrium Diethoxy barium Bis(pivaloylmethanato)copper | 2.66 4.54 12.9 | 2-n-butoxyethanol | 224 | 140 | 540 | 20 | Air |
| | Oxo acid compound mixed with precursor oxide | Copper sulfate | 1.69 | | 7 | | | | |
| Example 8 | Metal compound used for preparing metal compound solution | Bis(pivaloylmethanato)copper Triisopropoxy yttrium Diethoxy barium | 12.9 2.66 4.66 | 2-n-butoxyethanol | 194 | 140 | 540 | 20 | Air |
| | Oxo acid compound mixed with precursor oxide | Barium sulfate | 1.4 | | 5 | | | | |
| Example 9 | Metal compound used for preparing metal compound solution | Tris(2,4-pentanedionato)iron Triisopropoxy yttrium | 17.65 8.25 | 2-n-butoxyethanol | 109 | 140 | 540 | 20 | Air |
| | Oxo acid compound mixed with precursor oxide | Yttrium nitrate hexahydrate | 2.48 | | 7 | | | | |
| Example 10 | Metal compound used for preparing metal compound solution | Triisopropoxy yttrium Tris(2,4-pentanedionato)iron | 6.72 17.65 | 2-n-butoxyethanol | 207 | 140 | 540 | 20 | Air |
| | Oxo acid compound mixed with precursor oxide | Iron nitrate hexahydrate | 3.63 | | 11 | | | | |

TABLE 3

| | | Raw material compound | | Solvent | | First heat treatment | Second heat treatment | | |
|---|---|---|---|---|---|---|---|---|---|
| | | Type | Used amount [parts by mass] | Type | Used amount [parts by mass] | Heating temperature [° C.] | Heating temperature [° C.] | Heating time [minute] | Atmosphere |
| Example 11 | Metal compound used for preparing metal compound solution | Tris(2,4-pentanedionato)iron Triisopropoxy yttrium | 17.65 7.98 | 2-n-butoxyethanol | 152 | 140 | 540 | 20 | Air |

TABLE 3-continued

|  |  | Raw material compound |  | Solvent |  | First heat treatment | Second heat treatment | | |
|---|---|---|---|---|---|---|---|---|---|
|  |  | Type | Used amount [parts by mass] | Type | Used amount [parts by mass] | Heating temperature [° C.] | Heating temperature [° C.] | Heating time [minute] | Atmosphere |
| Example 12 | Oxo add compound mixed with precursor oxide | Yttrium sulfate octahydrate | 4.194 |  | 4.8 |  |  |  |  |
|  | Metal compound used for preparing metal compound solution | Triisopropoxy yttrium Tris(2,4-pentanedionato)iron | 7.98 17.65 | 2-n-butoxyethanol | 231.5 | 140 | 540 | 20 | Air |
|  | Oxo add compound mixed with precursor oxide | Iron sulfate heptahydrate | 1.368 |  | 8 |  |  |  |  |

TABLE 4

|  |  | Raw material compound |  | Solvent |  | First heat treatment | Second heat treatment | | |
|---|---|---|---|---|---|---|---|---|---|
|  |  | Type | Used amount [parts by mass] | Type | Used mount [parts by mass] | Heating temperature [° C.] | Heating temperature [° C.] | Heating time [minute] | Atmosphere |
| Comparative Example 1 | Metal compound used for preparing metal compound solution | Triethoxy yttrium Triisopropoxy aluminum Triisopropoxy cerium | 6.52 10.20 0.29 | 2-n-butoxyethanol | 208 | 140 | 540 | 20 | Air |
| Comparative Example 2 | Metal compound used for preparing metal compound solution | Triethoxy yttrium Diethoxy barium Bis(dipivaloylmethanato)copper | 2.24 4.54 12.90 | 2-n-butoxyethanol | 192 | 140 | 540 | 20 | Air |
| Comparative Example 3 | Metal compound used for preparing metal compound solution | Triethoxy yttrium Triisopropoxy aluminum Tris(2,4-pentanedionato)iron | 6.72 1.22 15.53 | 2-n-butoxyethanol | 198 | 140 | 540 | 20 | Air |
| Comparative Example 4 | — | $Y_2O_3$, $Al_2O_3$, $CeO_2$ | 4.57, 3.55, 0.216 | — | — | — | 540 | 20 | Air |
| Comparative Example 5 | — | $Y_2O_3$, BaO, CuO | 3.15, 4.27, 3.32 | — | — | — | 540 | 20 | Air |
| Comparative Example 6 | — | $Y_2O_3$, $Al_2O_3$, $Fe_2O_3$ | 4.72, 0.43, 4.89 | — | — | — | 540 | 20 | Air |

TABLE 5

|  | Precursor oxide | | | Oxo acid compound | | |
|---|---|---|---|---|---|---|
|  | Crystal phase | Crystal grain size [nm] | Content XP [% by mass] | Composition | Content XO [% by mass] | XO/XP |
| Example 1 | Perovskite | 40 | 67.9 | $Y(NO_3)$ | 1.9 | 0.028 |
| Example 2 | Perovskite | 40 | 84.6 | $Y_2(SO_4)_3$ | 2.2 | 0.026 |
| Example 3 | Perovskite | 40 | 64.1 | $Al(NO_3)_3$ | 2.5 | 0.039 |
| Example 4 | Perovskite | 40 | 97.5 | $Al(NO_3)_3$ | 3.9 | 0.04 |
| Example 5 | Copper oxide, $BaCO_3$, yttrium carbonate | 40 | 90.9 | $Cu(NO_3)_2$ | 3 | 0.033 |
| Example 6 | Copper oxide, $BaCO_3$, yttrium carbonate | 40 | 66.7 | $Ba(NO_3)_2$ | 0.4 | 0.006 |
| Example 7 | Cubic crystal ($BaCuO_2$-like crystal) | 40 | 94.9 | $Cu(SO_4)$ | 3.7 | 0.039 |
| Example 8 | Cubic crystal ($BaCuO_2$-like crystal) | 40 | 93.3 | $Ba(SO_4)$ | 0.56 | 0.006 |
| Example 9 | $YFeO_3$ | 40 | 80.8 | $Y(NO_3)$ | 2.1 | 0.026 |
| Example 10 | $YFeO_3$ | 40 | 81.3 | $Fe(NO_3)_3$ | 1.3 | 0.016 |
| Example 11 | $YFeO_3$ | 40 | 97.4 | $Y_2(SO_4)_3$ | 3.7 | 0.038 |
| Example 12 | $YFeO_3$ | 40 | 73.7 | $FeSO_4$ | 1.4 | 0.019 |
| Comparative Example 1 | Cerium carbonate, yttrium oxide, aluminum oxide | 200 | 99.4 | — | — | — |
| Comparative Example 2 | $BaCO_3$, copper oxide, yttrium oxide | 600 | 100 | — | — | — |
| Comparative Example 3 | $YFeO_3$ $Fe_2O_3$ | 600 | 100 | — | — | — |
| Comparative Example 4 | $Y_2O_3$, $Al_2O_3$, $CeO_2$ | 600 | 100 | — | — | — |

TABLE 5-continued

| | Precursor oxide | | | Oxo acid compound | | |
|---|---|---|---|---|---|---|
| | Crystal phase | Crystal grain size [nm] | Content XP [% by mass] | Composition | Content XO [% by mass] | XO/XP |
| Comparative Example 5 | $Y_2O_3$, BaO, CuO | 600 | 100 | — | — | — |
| Comparative Example 6 | $Y_2O_3$, $Al_2O_3$, $Fe_2O_3$ | 600 | 100 | — | — | — |

The precursor oxide constituting the solid composition according to Examples and the solid composition according to Comparative Examples were analyzed using an X-ray diffractometer X'Pert-PRO manufactured by Philips to obtain X-ray diffraction patterns. The X-ray diffraction patterns of the precursor oxides constituting the solid compositions according to Examples 1 to 4 and the solid composition according to Comparative Example 1 are shown in FIG. 1.

6. Production of Functional Ceramic

The functional ceramic was produced in the following manner using the solid compositions according to Examples and Comparative Examples.

First, 1 g of a sample was taken out from each of the solid compositions.

Next, a pellet dice that is provided with an exhaust port having an inner diameter of 13 mm and is manufactured by Specac is filled with each of these samples, and was press-formed with a weight of 6 kN to obtain pellets serving as a shaped object. The obtained pellets were placed in an alumina crucible and fired at 900° C. for 8 hours in an air atmosphere to obtain a pellet-like functional ceramic.

The solid compositions according to Examples and Comparative Examples and the functional ceramic obtained as described above using the solid compositions were analyzed using the X-ray diffractometer X'Pert-PRO manufactured by Philips to obtain X-ray diffraction patterns.

As a result, in Examples described above, it was confirmed that the precursor oxides contained in the solid compositions and the functional ceramics were composed of different crystal phases from each other.

Figure 2:
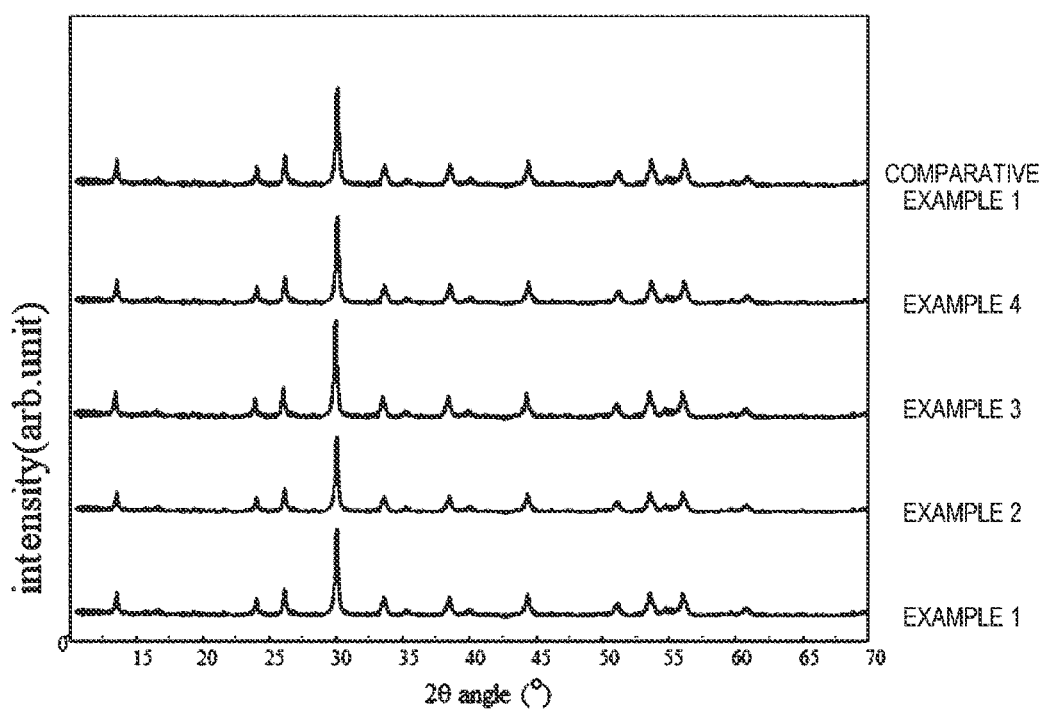
FIG. 2 is a graph showing X-ray diffraction patterns of functional ceramics according to Examples 1 to 4 and Comparative Example 1.

The functional ceramics according to Examples and Comparative Examples were analyzed using the X-ray diffractometer X'Pert-PRO manufactured by Philips to obtain X-ray diffraction patterns. The X-ray diffraction patterns of the functional ceramics according to Examples 1 to 4 and Comparative Example 1 are shown in FIG. 2.

From these results, in Examples described above, it was confirmed that the precursor oxides contained in the solid compositions were composed of crystal phases different from crystal phases of the functional ceramics formed using the solid compositions.

Table 6 collectively shows the compositions and crystal phases of the functional ceramics according to Examples and Comparative Examples. The content of the oxo acid compound in the functional ceramic according to Examples and Comparative Examples was 10 ppm or less.

TABLE 6

| | Composition | Crystal phase |
|---|---|---|
| Example 1 | $Y_{2.91}Ce_{0.09}Al_5O_{12}$ | Cubic garnet type |
| Example 2 | $Y_{2.91}Ce_{0.09}Al_5O_{12}$ | Cubic garnet type |
| Example 3 | $Y_{2.91}Ce_{0.09}Al_5O_{12}$ | Cubic garnet type |
| Example 4 | $Y_{2.91}Ce_{0.09}Al_5O_{12}$ | Cubic garnet type |
| Example 5 | $YBa_2Cu_3O_{7-\delta}$ | Perovskite type |
| Example 6 | $YBa_2Cu_3O_{7-\delta}$ | Perovskite type |
| Example 7 | $YBa_2Cu_3O_{7-\delta}$ | Perovskite type |
| Example 8 | $YBa_2Cu_3O_{7-\delta}$ | Perovskite type |
| Example 9 | $Y_3Al_{0.6}Fe_{4.4}O_{12}$ | Garnet type |
| Example 10 | $Y_3Al_{0.6}Fe_{4.4}O_{12}$ | Garnet type |
| Example 11 | $Y_3Al_{0.6}Fe_{4.4}O_{12}$ | Garnet type |
| Example 12 | $Y_3Al_{0.6}Fe_{4.4}O_{12}$ | Garnet type |
| Comparative Example 1 | $Y_{2.91}Ce_{0.09}Al_5O_{12}$ | Cubic garnet type |
| Comparative Example 2 | $YBa_2Cu_3O_{7-\delta}$ | Perovskite type |
| Comparative Example 3 | $Y_3Al_{10.6}Fe_{4.4}O_{12}$ | $YFeO_3$ type |
| Comparative Example 4 | $Y_2O_3$, $Al_2O_3$, $CeO_2$ | $Y_2O_3$, $Al_2O_3$, $CeO_2$ |
| Comparative Example 5 | $Y_2O_3$, BaO, CuO | $Y_2O_3$, BaO, CuO |
| Comparative Example 6 | $Y_2O_3$, $Al_2O_3$, $Fe_2O_3$ | $Y_2O_3$, $Al_2O_3$, $Fe_2O_3$ |

7. Evaluation 7.1 Evaluation of Internal Quantum Yield

Among the functional ceramics produced in 6 above, the functional ceramics according to Examples 1 to 4 and Comparative Examples 1 and 4 were evaluated as follows.

That is, for the functional ceramics according to Examples 1 to 4 and Comparative Examples 1 and 4, which are phosphor ceramics, an internal quantum yield as a fluorescence characteristic was obtained by measurement using an absolute PL quantum-yield measurement device (Quantaurus-QYC11347-01, manufactured by Hamamatsu Photonics).

The results are collectively shown in table 7.

TABLE 7

| | Internal quantum yield [%] |
|---|---|
| Example 1 | 33 |
| Example 2 | 29 |
| Example 3 | 37 |
| Example 4 | 31 |
| Comparative Example 1 | 13 |
| Comparative Example 4 | 26 |

Figure 3:
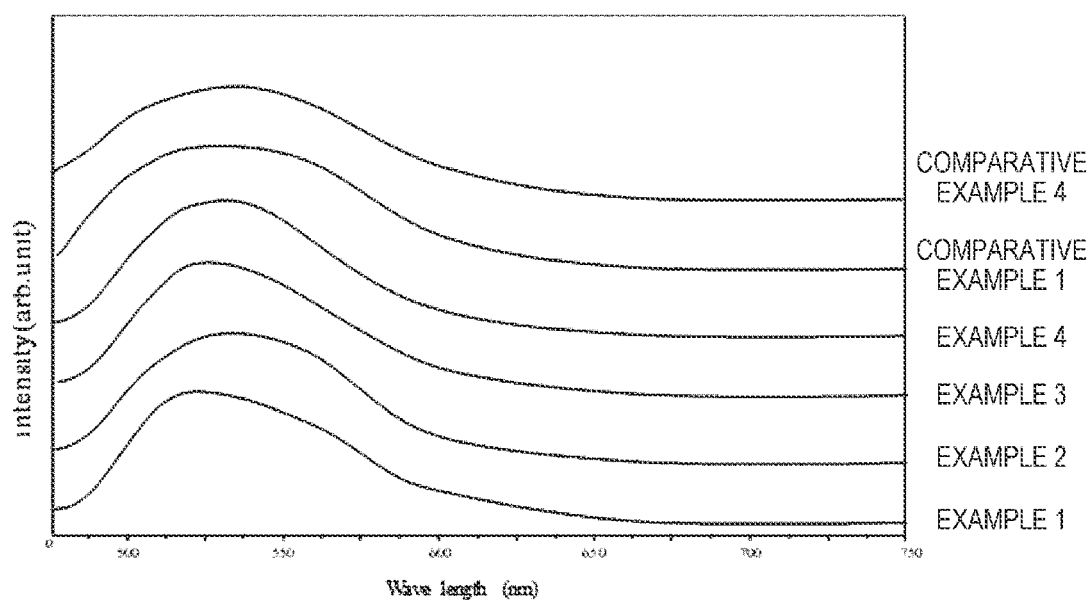
FIG. 3 is a graph showing emission spectrum obtained by measurement of functional ceramics according to Examples 1 to 4, Comparative Example 1 and Comparative Example 4 using a spectrofluorophotometer.

As is clear from table 7, excellent results were obtained in the present disclosure. In contrast, satisfactory results were not obtained in Comparative Examples. In addition, for the functional ceramics according to Examples 1 to 4 which are phosphor ceramics, emission spectrum obtained by measurement using a spectrofluorophotometer (F-7000, manufactured by Hitachi High-Tech Science Corporation) are shown in FIG. 3.

7.2 Evaluation of Critical Current in Magnetic Field

Among the functional ceramics produced in 6 above, the functional ceramics according to Examples 5 to 8 and Comparative Examples 2 and 5 were evaluated as follows.

That is, indium electrodes were attached to both main surfaces of the functional ceramics according to Examples 5 to 8 and Comparative Examples 2 and 5, which are superconductor ceramics, respectively, and critical current measurement in a magnetic field of a magnet of 3 T at a liquid nitrogen temperature of 77.3 K was performed by four-terminal method.

The results are collectively shown in table 8.

TABLE 8

|  | Critical current in magnetic field [A/cm − w] |
| --- | --- |
| Example 5 | 225 |
| Example 6 | 219 |
| Example 7 | 201 |
| Example 8 | 211 |
| Comparative Example 2 | 37 |
| Comparative Example 5 | 44 |

As is clear from table 8, excellent results were obtained in the present disclosure. In contrast, satisfactory results were not obtained in Comparative Examples.

7.3 Measurement and Evaluation of Magnetic Susceptibility

Among the functional ceramics produced in 6 above, the functional ceramics according to Examples 9 to 12 and Comparative Examples 3 and 6 were evaluated as follows.

That is, for the functional ceramics according to Examples 9 to 12 and Comparative Examples 3 and 6, which are magnetic ceramics, saturation magnetization and a ferromagnetic resonance half width ΔH were obtained using a vibrating sample magnetometer (VSM-C7 manufactured by Toei Industry).

The results are collectively shown in table 9.

TABLE 9

|  | Saturation magnetization [4nJs] | Ferromagnetic resonance half width ΔH [Oe] |
| --- | --- | --- |
| Example 9 | 2080 | 48 |
| Example 10 | 2170 | 49 |
| Example 11 | 2030 | 44 |
| Example 12 | 1990 | 45 |
| Comparative Example 3 | 740 | 95 |
| Comparative Example 6 | 890 | 88 |

As is clear from table 9, excellent results were obtained in the present disclosure. In contrast, satisfactory results were not obtained in Comparative Examples.

As described above, in the present disclosure, excellent results were obtained regardless of the type of the functional ceramics.

What is claimed is:

1. A method for producing a solid composition used for forming a functional ceramic that has a first crystal phase, the method comprising:
   producing an oxide composed of a second crystal phase different from the first crystal phase, the producing of the oxide being performed by subjecting a mixture containing a plurality of types of metal compounds as a raw material to a heat treatment; and
   mixing the oxide and an oxo acid compound.

2. The method for producing a solid composition according to claim 1, wherein
   the oxide and the oxo acid compound are mixed such that 0.001≤XO/XP≤4.00, wherein a content of the oxide in the solid composition is defined as XP [% by mass] and a content of the oxo acid compound in the solid composition is defined as XO [% by mass].

3. The method for producing a solid composition according to claim 1, wherein
   the oxo acid compound contains, as an oxo anion, at least one of a nitrate ion and a sulfate ion.

4. The method for producing a solid composition according to claim 1, wherein
   the second crystal phase is a perovskite type crystal, and the first crystal phase is a cubic garnet type crystal.

5. The method for producing a solid composition according to claim 1, wherein
   the second crystal phase is a cubic type crystal, and the first crystal phase is a perovskite type crystal.

6. The method for producing a solid composition according to claim 1, wherein
   the second crystal phase is a $YFeO_3$ type crystal, and the first crystal phase is a garnet type crystal.

7. The method for producing a solid composition according to claim 1, wherein
   the oxide has a crystal grain size of 10 nm or more and 200 nm or less.

8. A method for producing a functional ceramic, comprising:
   producing a solid composition by the method according to claim 1; and
   heating the solid composition at a temperature of 700° C. or higher and 1000° C. or lower.

* * * * *